US009446721B2

(12) United States Patent
Jagoda (10) Patent No.: US 9,446,721 B2
(45) Date of Patent: Sep. 20, 2016

(54) VEHICLE CAMERA-SECURING ASSEMBLY

(71) Applicant: ILLINOIS TOOL WORKS INC., Glenview, IL (US)

(72) Inventor: Aaron M. Jagoda, Warren, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 58 days.

(21) Appl. No.: 14/375,456

(22) PCT Filed: Jan. 30, 2013

(86) PCT No.: PCT/US2013/023757
§ 371 (c)(1),
(2) Date: Jul. 30, 2014

(87) PCT Pub. No.: WO2013/116277
PCT Pub. Date: Aug. 8, 2013

(65) Prior Publication Data
US 2015/0008300 A1 Jan. 8, 2015

Related U.S. Application Data

(60) Provisional application No. 61/593,933, filed on Feb. 2, 2012, provisional application No. 61/637,328, filed on Apr. 24, 2012.

(51) Int. Cl.
*A47F 5/00* (2006.01)
*B60R 11/04* (2006.01)
*B60R 13/00* (2006.01)
*B60R 11/00* (2006.01)

(52) U.S. Cl.
CPC ............. *B60R 11/04* (2013.01); *B60R 13/005* (2013.01); *B60R 2011/004* (2013.01)

(58) Field of Classification Search
CPC combination set(s) only.
See application file for complete search history.

(56) References Cited

U.S. PATENT DOCUMENTS

| 4,615,597 A | * | 10/1986 | Burriss | B60R 11/04 248/183.1 |
| 5,260,731 A | * | 11/1993 | Baker, Jr. | B60R 11/04 224/556 |
| 5,289,321 A | * | 2/1994 | Secor | B60K 35/00 348/118 |
| 5,491,464 A | * | 2/1996 | Carter | B60Q 1/2611 340/425.5 |

(Continued)

FOREIGN PATENT DOCUMENTS

| DE | 102005011953 A1 | 3/2006 |
| EP | 1083099 A1 | 3/2001 |

(Continued)

OTHER PUBLICATIONS

Translation of DE 102005011953 filed on IDS dated Jul. 30, 2014.*

(Continued)

*Primary Examiner* — Monica Millner
(74) *Attorney, Agent, or Firm* — The Small Patent Law Group, LLC; Joseph M. Butscher (57) ABSTRACT

A video monitoring system is configured to be secured to a portion of a vehicle. The system may include a vehicle camera-securing assembly that includes a securing bracket including a plurality of walls defining a camera chamber, and at least one camera-securing member. The system may also include a camera positioned within the camera chamber. The camera is securely retained within the camera chamber by the at least one camera-securing member.

18 Claims, 8 Drawing Sheets

(56) References Cited

U.S. PATENT DOCUMENTS

| | | | | |
|---|---|---|---|---|
| 5,835,808 A * | 11/1998 | Parker | B60R 11/04 | 396/419 |
| 5,876,005 A * | 3/1999 | Vasconi | F16M 11/10 | 248/276.1 |
| 6,151,065 A * | 11/2000 | Steed | B60Q 1/0023 | 348/148 |
| 6,196,504 B1 * | 3/2001 | Lemke | F16M 11/04 | 248/187.1 |
| 6,698,942 B2 * | 3/2004 | Ward | F16M 11/04 | 396/421 |
| 7,391,014 B2 * | 6/2008 | Saccagno | B60R 1/12 | 250/208.1 |
| 7,579,939 B2 * | 8/2009 | Schofield | B60C 23/00 | 340/425.5 |
| 7,609,961 B2 * | 10/2009 | Park | G03B 17/00 | 348/148 |
| 7,965,336 B2 * | 6/2011 | Bingle | B60R 11/04 | 348/149 |
| 8,137,008 B1 * | 3/2012 | Mallano | B60R 11/04 | 396/427 |
| 8,284,239 B2 * | 10/2012 | Chiu | B60R 1/12 | 348/47 |
| 8,408,347 B2 * | 4/2013 | Chapman | B60R 11/04 | 180/89.1 |
| 2002/0080016 A1 * | 6/2002 | Keirstead | B60R 1/00 | 340/436 |
| 2004/0114039 A1 * | 6/2004 | Ishikura | B60R 1/00 | 348/148 |
| 2005/0030418 A1 * | 2/2005 | Hoffman | H04N 5/2252 | 348/373 |
| 2005/0046696 A1 * | 3/2005 | Lang | B60Q 1/0023 | 348/148 |
| 2007/0171032 A1 * | 7/2007 | Dayan | B60R 11/0235 | 340/435 |
| 2007/0216770 A1 * | 9/2007 | Chang | B60Q 1/0023 | 348/148 |
| 2008/0144924 A1 * | 6/2008 | Hoffmann | G06T 7/002 | 382/154 |
| 2008/0309765 A1 * | 12/2008 | Dayan | H04N 7/185 | 348/158 |
| 2009/0153663 A1 * | 6/2009 | Ramos | B60R 1/00 | 348/148 |
| 2010/0129070 A1 * | 5/2010 | Balasundara-mohan | G03B 17/00 | 396/419 |

FOREIGN PATENT DOCUMENTS

| | | | | |
|---|---|---|---|---|
| GB | EP 1785316 A1 * | 5/2007 | | B60R 19/483 |
| IT | EP 1878624 A1 * | 1/2008 | | G01D 11/245 |
| JP | 2005271715 A | 10/2005 | | |
| JP | 2009083720 A | 4/2009 | | |

OTHER PUBLICATIONS

ISR and WO for PCT/US2013/023757 dated Apr. 8, 2013.

\* cited by examiner

VEHICLE CAMERA-SECURING ASSEMBLY

RELATED APPLICATIONS

This application is a National Phase of PCT/US2013/023757 filed Jan. 30, 2013. This application relates to and claims priority benefits from U.S. Provisional Patent Application No. 61/593,933, entitled "Vehicle Camera-Securing Assembly," filed Feb. 2, 2012, which is hereby incorporated by reference in its entirety.

This application also relates to and claims priority benefits from U.S. Provisional Patent Application No. 61/637,328, entitled "Vehicle Camera-Securing Assembly," filed Apr. 24, 2012, which is also hereby incorporated by reference in its entirety.

FIELD OF EMBODIMENTS OF THE DISCLOSURE

Embodiments of the present disclosure generally relate to a vehicle camera-securing assembly configured to be secured to a rear portion of a vehicle, such as an automobile.

BACKGROUND

Various vehicles, such as automobiles, have rear-view or back-up cameras positioned on rear portions. A typical rear-view or back-up camera (hereafter referred to as a "rear-view camera") assists a driver when a vehicle is in reverse. For example, the rear-view camera is typically in communication with a monitor within the cabin of the vehicle. As the vehicle reverses, the driver may refer to the monitor within the vehicle. The monitor displays real-time images from the rear-view camera. In this manner, the driver may be alerted to various hazards that he/she would not otherwise see.

A typical rear-view camera is secured to a plate, cover, bracket, or the like, of a vehicle through fasteners, such as screws, and a mounting bracket. The mounting bracket is, in turn, secured to the rear of the vehicle, such as a tailgate of a truck, through fasteners.

A typical vehicle camera-securing assembly includes a plastic bracket or housing that is aligned and positioned within an emblem plate, shield, badge, cover, or the like. The rear-view camera is mounted in the housing and secured therein through a fastener, such as a screw, and a retaining bracket. The housing is then secured within the emblem plate with separate and distinct fasteners.

In general, a typical camera-securing assembly includes numerous separate and distinct components that are used to complete the assembly. As such, the process of manufacturing may prove time-consuming and labor-intensive.

SUMMARY OF EMBODIMENTS OF THE DISCLOSURE

Certain embodiments of the present disclosure provide a vehicle camera-securing assembly configured to secure a camera to a portion of a vehicle. The vehicle camera-securing assembly may include a securing bracket including a plurality of walls defining a camera chamber configured to receive the camera, and at least one camera-securing member configured to securely retain the camera within the camera chamber.

The camera-securing member(s) may include one or more retaining clips extending into the camera chamber from one or more of the plurality of walls. The camera securing member(s) may include first and second opposed retaining clips extending from first and second walls. The retaining clip(s) may include a resilient beam integrally connected to a detent.

The securing bracket may include a lens channel configured to receive a lens of the camera. The securing bracket may also include support ledges surrounding at least a portion of the lens channel. The support ledges may be configured to abut against at least a portion of the camera. The securing bracket may also include at least one support brace ramp extending from at least one of the plurality of walls. The support brace ramp(s) is configured to support the securing bracket within the portion of the vehicle. The securing bracket may also include one or more ledges outwardly extending from one or more of the plurality of walls. The ledge(s) may be configured to be securely engaged by one or more reciprocal features of at least a portion of the vehicle.

In an embodiment, the camera-securing member(s) may include a securing latch configured to pivot over the camera chamber. The securing latch may include a beam integrally connected to one of the plurality of walls through a hinge. The beam may also include a distal tab or slot.

The securing bracket and the camera-securing member(s) may be devoid of separate and distinct fasteners. The assembly may not use separate and distinct fasteners to secure the camera to the securing bracket.

Certain embodiments of the present disclosure provide a video monitoring system configured to be secured to a portion of a vehicle. The video monitoring system may include a vehicle camera-securing assembly that includes a securing bracket including a plurality of walls defining a camera chamber, and at least one camera-securing member. The system may also include a camera positioned within the camera chamber. The camera is securely retained within the camera chamber by the at least one camera-securing member.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 1:
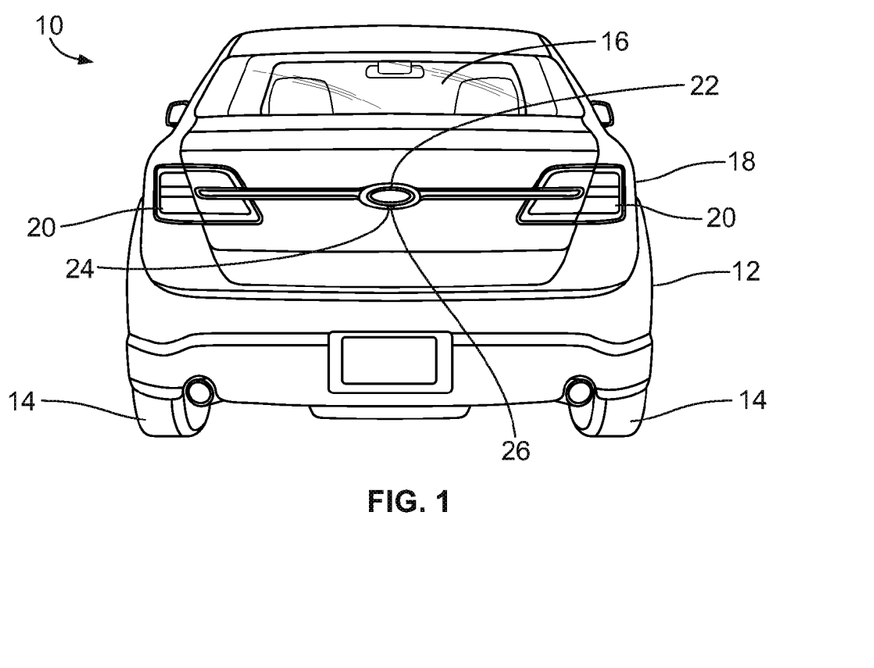
FIG. 1 illustrates a rear view of a vehicle, according to an embodiment of the present disclosure.

FIG. 1 illustrates a rear view of a vehicle 10, according to an embodiment of the present disclosure. The vehicle 10 may be an automobile that includes an outer body 12 secured to a frame (hidden from view) that also supports axles connected to wheels 14. The frame and outer body 12 also support an internal cabin 16, in which a driver and passengers may be seated.

A rear end 18 of the vehicle 10 includes tail lights 20 and an emblem plate 22, which may generally be between the tail lights 20. However, the emblem plate 22 may be at various other locations of the rear end 18.

The emblem plate 22 may include an opening 24 that allows a lens 26 of a rear view camera to extend therethrough. The lens 26 may be covered by a protective transparent cover, which may be formed of plastic, reinforced glass, or the like.

Figure 2:
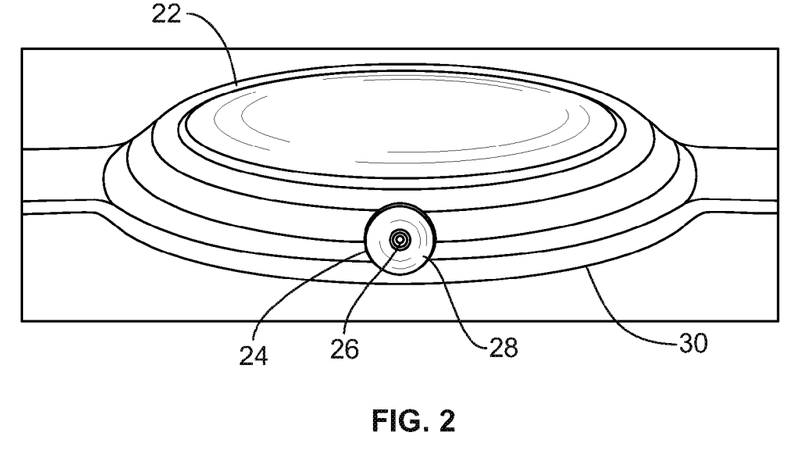
FIG. 2 illustrates an isometric view of an emblem plate, according to an embodiment of the present disclosure.

FIG. 2 illustrates an isometric view of the emblem plate 22, according to an embodiment of the present disclosure. The protective transparent cover 28 may be secured over the lens 26 that securely extends into or proximate to the opening 24 formed in a lower portion 30 of the emblem plate 22. Alternatively, the opening 24 may be formed through various other portions of the emblem plate 22.

The lens 26 is part of a rear-view camera. The rear-view camera may be secured to the emblem plate 22 through a vehicle camera-securing assembly, as described below.

Figure 3:
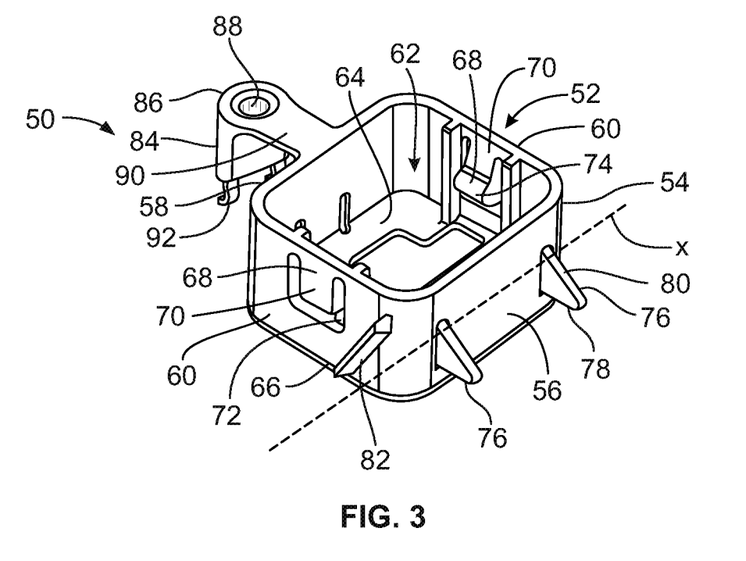
FIG. 3 illustrates an isometric top view of a vehicle camera-securing assembly, according to an embodiment of the present disclosure.

FIG. 3 illustrates an isometric top view of a vehicle camera-securing assembly 50, according to an embodiment. The assembly 50 includes a securing bracket 52 having a main body 54. The main body 54 includes front and rear walls 56 and 58, respectively, integrally connected to lateral walls 60. The front and rear walls 56 and 58 may integrally connect to the lateral walls 60 at right angles, thereby providing a generally rectangular or square shape. However, the securing bracket 52 may be formed in various other shapes and sizes. The securing bracket 52 may be formed of plastic, metal, or the like. For example, the securing bracket 52 may be molded as an integral piece of plastic.

The walls 56, 58, and 60 define an internal camera chamber 62. Planar support ledges 64 extend inwardly from bottom surfaces of the walls 56, 58, and 60 at a base 66 of the securing bracket 52. The support ledges 64 may be flat, planar surfaces that may be perpendicular to the walls 56, 58, and 60.

Camera-securing members, such as opposed retaining clips 68, inwardly extend into the camera chamber 62 from the lateral walls 60. Each retaining clip 68 includes a resilient beam 70 extending from a portion of the lateral wall 60 within a clearance area 72. Each resilient beam 70 connects to a distal detent 74, such as a snap, barb, latch, clasp, or the like. The retaining clips 68 are configured to flex within the clearance areas 72 in order to snapably engage a reciprocal feature of the emblem plate 22, for example. While the retaining clips 68 are shown as extending from the lateral walls 60, the retaining clips 68 may, alternatively, extend from the front and rear walls 56 and 58, respectively, Additionally, more or less retaining clips 68 than those shown may be used. For example, each wall 56, 58, and 60 may include a retaining clip 68.

Angled support brace ramps 76 may extend outwardly from the front wall 56. As shown, the support brace ramps 76 include a straight lower edge 78 proximate the base 66 that integrally connects to an angled edge 80 that extends toward and connects proximate to an axis x of the front wall 56. The support brace ramps 76 are configured to cooperate with reciprocal features formed in the emblem plate 22 to securely support the securing bracket 52 within the emblem plate 22. For example, the support brace ramps 76 may abut into an interior wall of the emblem plate 22 in order to securely brace the securing bracket 52 within the emblem plate 22.

Additionally, angled ledges 82 may outwardly extend from the lateral walls 60. The angled ledges 82 are configured to cooperate with reciprocal features, such as retaining tabs, formed in the emblem plate 22. For example, the angled ledges 82 may cooperate with reciprocal notches formed within the emblem plate, in order to properly orient and secure the securing bracket 52 within the emblem plate 22.

A fastener-retaining boss 84 may extend from the rear wall 58. The fastener-retaining boss 84 may include a generally cylindrical tube 86 defining a fastener passage 88. The tube 86 integrally connects to an extension beam 90 that integrally extends from the rear wall 58. Securing members 92, such as clasps, latches, snaps, or the like, may extend from a lower end of the fastener-retaining boss 84, and may be configured to securely engage reciprocal features within the emblem plate 22. The fastener-retaining boss 84 is configured to receive and retain a fastener, such as a screw, bolt, or the like, that secures the securing bracket 52 to the emblem plate 22 and the rear of the vehicle 10. More than one fastener-retaining boss 84 may be used. For example, a fastener-retaining boss 84 may extend outwardly from each wall 56, 58, and 60 of the securing bracket 52.

Figure 4:
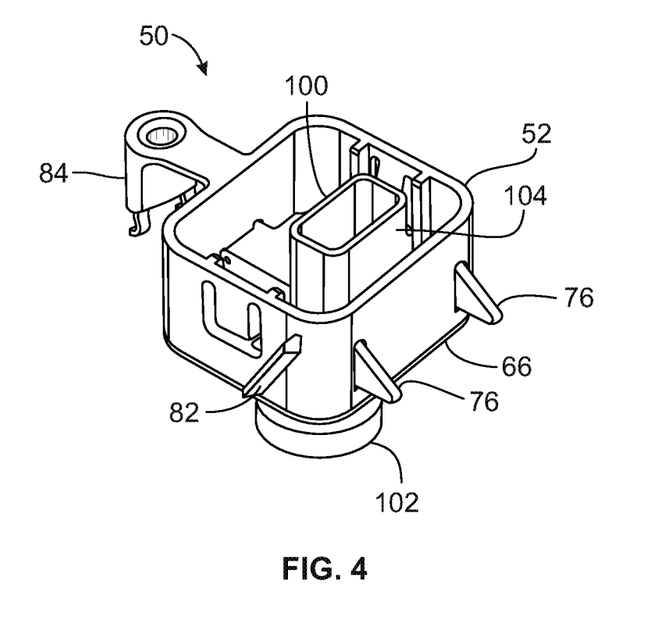
FIG. 4 illustrates an isometric top view of a vehicle camera-securing assembly having a rear-view camera secured therein, according to an embodiment of the present disclosure.
Figure 5:
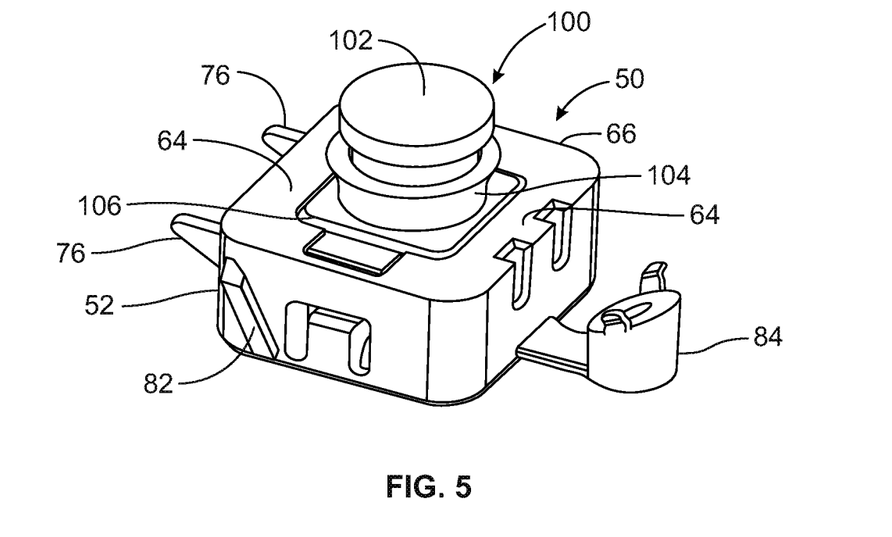
FIG. 5 illustrates an isometric bottom view of a vehicle camera-securing assembly having a rear-view camera secured therein, according to an embodiment of the present disclosure.

FIG. 4 illustrates an isometric top view of the vehicle camera-securing assembly 50 having a rear-view camera 100 secured within the securing bracket 52, according to an embodiment of the present disclosure. FIG. 5 illustrates an isometric bottom view of the vehicle camera-securing assembly 50 having the rear-view camera 100 secured within the securing bracket 52. Referring to FIGS. 4 and 5, the rear-view camera 100 includes a lens 102 secured to a housing 104, which contains camera hardware, software, circuitry, and the like (not shown). As shown in FIG. 5, the lens 102 extends through a lens channel 106 defined between the support ledges 64. Interior surfaces of the support ledges 64 abut against portions of housing 104 that are unable to pass into the lens channel 106. The lens 102 of the rear-view camera 100 extends downwardly from the base 66 of the securing bracket 52. The lens 102 is configured to pass into and/or through the opening 24 formed in the emblem plate 22 (shown in FIGS. 1 and 2).

Figure 6:
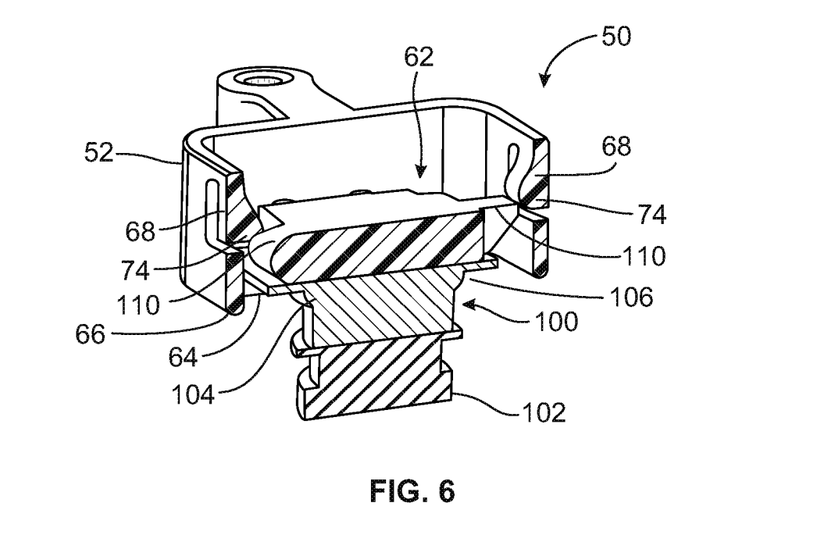
FIG. 6 illustrates a cross-sectional internal view of a vehicle camera-securing assembly having a rear-view camera secured therein, according to an embodiment of the present disclosure.

FIG. 6 illustrates a cross-sectional internal view of the vehicle camera-securing assembly 50 having the rear-view camera 100 secured therein. As shown in FIG. 6, the lens 102 of the rear-view camera 100 passes through the lens channel 106 formed in the base 66 of the securing bracket 52. However, the housing 104 is too large to fit through the channel lens 106. As such, the housing 104 remains within the camera chamber 62.

The retaining clips 68 cooperate with reciprocal features on the housing 104 to snapably lock the housing 104 within the camera chamber 62. For example, the detents 74 may snapably secure to ridges 110 of the housing 104. At least a portion of the housing is snapably and securely retained between the detents 74 and the support ledges 64. Accordingly, the rear-view camera 100 is secured to the securing bracket 52.

Figure 7:
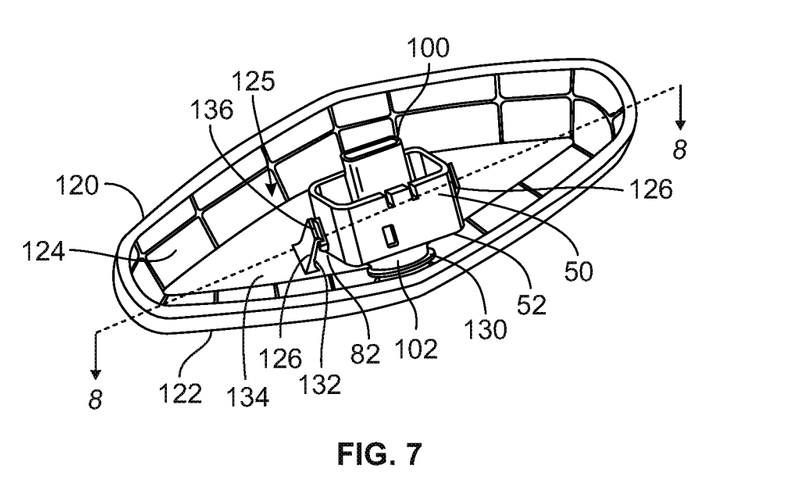
FIG. 7 illustrates an isometric internal view of an emblem plate having the vehicle camera-securing assembly secured therein, according to an embodiment of the present disclosure.

FIG. 7 illustrates an isometric internal view of an emblem plate 120 having the vehicle camera-securing assembly 50 secured therein, according to an embodiment of the present disclosure. The emblem plate 120 includes a rim 122 integrally formed with a covering wall 124 that extends away from the rim 122. An internal cavity 125 is defined between the rim 122 and the covering wall 124. The emblem plate 120 may be various shapes and sizes, other than shown. For example, the emblem plate 120 may include an elliptical covering plate that extends away from an elliptical rim. Alternatively, the emblem plate 122 may be dome shaped, box shaped, or the like.

Securing tabs 126 extend inwardly from the covering wall 124. Two opposed securing tabs 126 may extend from an internal surface of the covering wall 124. The securing tabs 126 may generally be centered within the internal cavity 125 and are configured to securely engage the ledges 82 of the securing bracket 52 in order to secure the securing bracket 52 to the emblem plate 120. An opening 130 is generally centered between the opposed securing tabs 126 and is configured to allow the lens 102 to be positioned therethrough or proximate thereto.

Each securing tab 126 includes an extension beam 132 that extends from an internal surface 134 of the covering wall 124. A detent 136 extends from a distal end of each extension beam 132.

Figure 8:
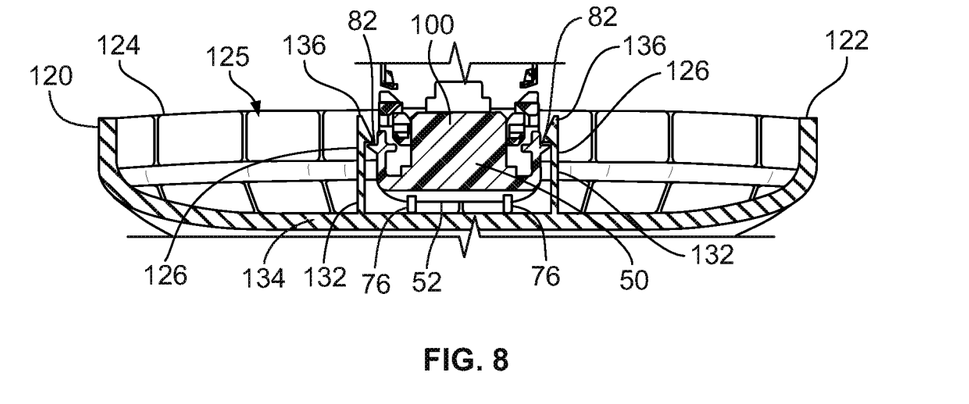
FIG. 8 illustrates a cross-sectional view of the emblem plate through line 8-8 of FIG. 7, according to an embodiment of the present disclosure.

FIG. 8 illustrates a cross-sectional view of the emblem plate 120 through line 8-8 of FIG. 7, according to an embodiment of the present disclosure. As shown, the support brace ramps 76 abut into the internal surface 134 to ensure that the vehicle camera-securing assembly 50 maintains a secure and proper orientation within the emblem plate 120.

Figure 9:
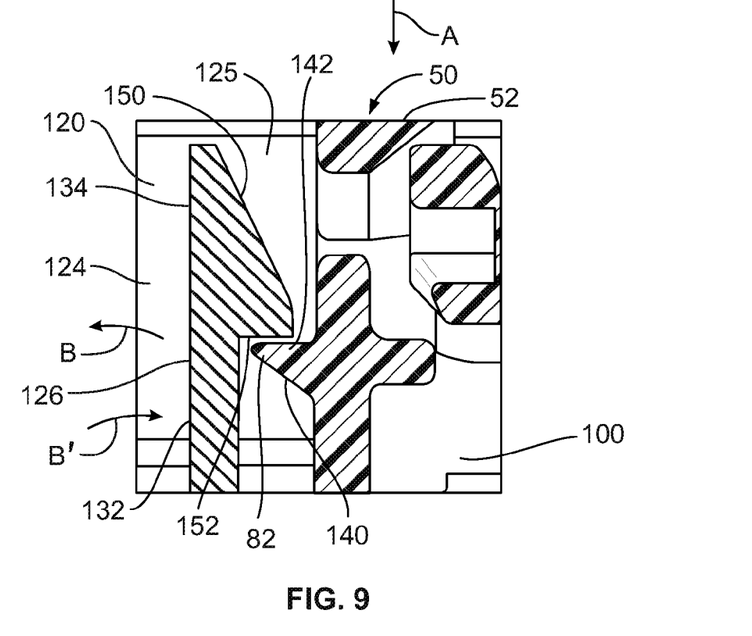
FIG. 9 illustrates a cross-sectional view of securing tabs of the emblem plate securely connecting to the ledges of the vehicle camera-securing assembly, according to an embodiment of the present disclosure.

FIG. 9 illustrates a cross-sectional view of the securing tabs 126 of the emblem plate 120 securely connecting to the ledges 82 of the vehicle camera-securing assembly 50, according to an embodiment of the present disclosure. Each ledge 82 includes a ramped surface 140 integrally connected to a flat surface 142. Similarly, each securing tab 126 includes a ramped surface 150 integrally connected to a flat surface 152.

Referring to FIGS. 8 and 9, in order to connect the vehicle camera-securing assembly 50 to the emblem plate 120, the securing bracket 52 is aligned between the opposed securing tabs 126. Once aligned, the vehicle camera-securing assembly 50 is urged into the internal cavity 125 in the direction of arrow A. During such movement, the ramped surfaces 140 slide over the ramped surfaces 150, thereby forcing the extension beams 132 to deflect outward in the direction of arc B (shown in FIG. 9). The ramped surfaces 140 continue to slide over the ramped surfaces 150 until the flat surfaces 142 engage the flat surfaces 152. When the flat surfaces 142 and 152 engage one another, the extension beams snap back in the direction of arc B', and the interface between the flat surfaces 142 and 152 securely locks the vehicle camera-securing assembly 50 to the emblem plate 120. The support brace ramps 76 abut into the interior surface 134 in order to support the vehicle camera-securing assembly 50 in a secure position within the emblem plate 120 (as shown in FIG. 8). In this manner, the vehicle camera-securing assembly 50 is secured to the emblem plate 120 without the need for separate and distinct fasteners. The lens 102 (shown in FIG. 7) of the rear-view camera 100 is oriented into the opening 130 formed through the emblem plate 120. The fastener retaining boss 84 (shown in FIGS. 3-6) may be configured to receive and retain a fastener, such as a screw or bolt, which then secures the vehicle camera-securing assembly 50, and therefore the emblem plate 120 (which is secured to the vehicle camera-securing assembly), to a rear of the vehicle.

It is to be understood that the emblem plate 120 may be any portion of a vehicle to which a rear-view camera is secured, whether or not an emblem is on or within the plate, cover, shield, badge, bracket, shell, or the like.

Figure 10:
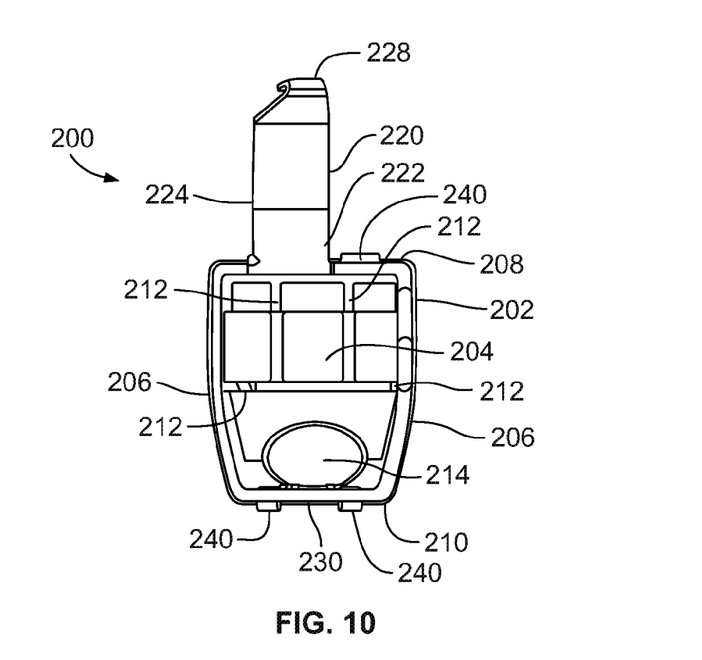
FIG. 10 illustrates a top view of a vehicle camera-securing assembly, according to an embodiment of the present disclosure.

FIG. 10 illustrates a top view of a vehicle camera-securing assembly 200, according to an embodiment of the present disclosure. The vehicle camera-securing assembly 200 includes a securing bracket 202 having a camera chamber 204 defined by lateral, upper, and lower walls 206, 208, and 210, respectively. The assembly 200 may include inwardly-directed locating ribs 212 within the camera chamber 204 that are configured to locate and securely support a rear-view camera within the camera chamber 204. The locating ribs 212 assure proper camera height, and securely engage the camera within the camera chamber 204.

The rear-view camera is positioned within the camera chamber 204 so that a lens extends into and/or through a lens channel 214, which may be located on an angled surface proximate to the lower wall 210. However, the lens channel 214 may be at any location of the assembly 200, depending on a desired location of a camera lens with respect to a vehicle. The locating ribs 212 properly orient and secure the camera within the camera chamber 204.

A camera-securing member, such as a securing latch 220, extends from the top wall 208, and is configured to pivot about a hinge 222 that integrally connects to the top wall 208. The hinge 222 integrally connects to a beam 224 having a retaining tab 228 at a distal end.

Once the rear-view camera is properly positioned within the camera chamber 204, the securing latch 220 is grasped and pivoted over the camera chamber 204 about the hinge 222. The retaining tab 226 is configured to be received and securely retained by a slot 230 formed through the lower wall 210 of the securing bracket 202. Alternatively, the slot may be formed at the distal end of the securing latch 220, and the tab may be formed at the lower wall 210 of the securing latch 220. Once the tab 226 is secured within the slot 230, the securing latch 220 securely retains the rear-view camera within the camera chamber 204. The camera is prevented from ejecting from the camera chamber 204 by the closed securing latch 220.

The securing bracket 202 may also include outwardly directed protuberances 240, such as prongs, that are configured to engage features on or within a vehicle to securely engage the securing bracket 202 and the rear-view camera to the vehicle. For example, the protuberances may engage reciprocal features within an emblem plate, or on or proximate to a light bar at a rear of a vehicle. The protuberances 240 may be located at various locations around the periphery of the securing bracket 202. As shown in FIG. 10, the protuberances 240 extend from the top and bottom walls 208 and 210. However, the protuberances 240 may extend from various other locations of the securing bracket 202.

Figure 11:
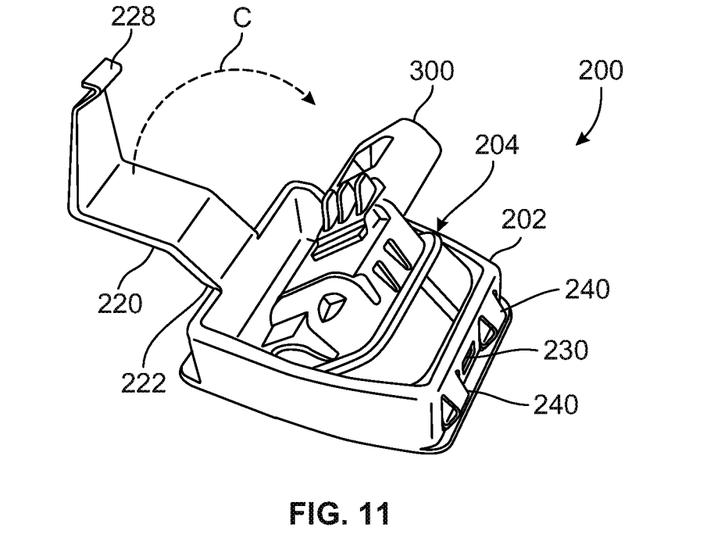
FIG. 11 illustrates an isometric top view of a vehicle camera-securing assembly having a rear-view camera within a camera chamber, according to an embodiment of the present disclosure.

FIG. 11 illustrates an isometric top view of the vehicle camera-securing assembly 200 having a rear-view camera 300 within the camera chamber 204, according to an embodiment of the present disclosure. The securing bracket 202 and the securing latch 220 may be sized and shaped to conform to the outer contours of the rear-view camera 300, or various other rear-view cameras. In order to securely retain the rear-view camera 300 within the camera chamber 204, the securing latch 220 is pivoted about the hinge 222 in the direction of arc C, until the tab 228 is securely retained within the slot 230.

Figure 12:
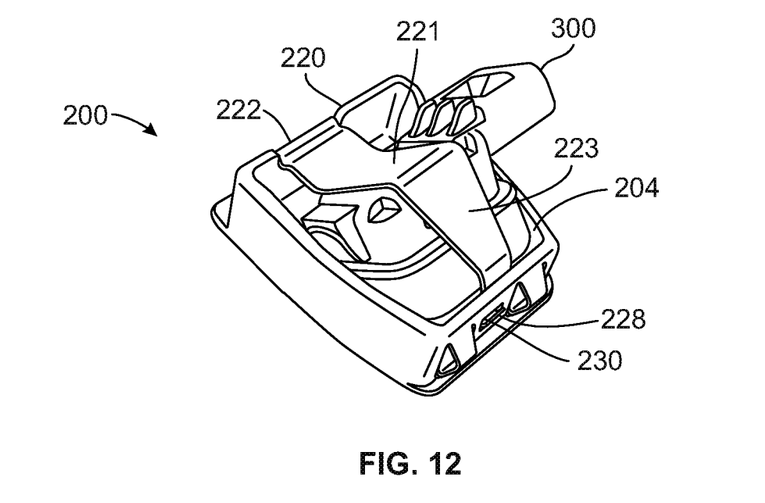
FIG. 12 illustrates an isometric top view of a vehicle camera-securing assembly securely retaining a rear-view camera within a camera chamber, according to an embodiment of the present disclosure.

FIG. 12 illustrates an isometric top view of the vehicle camera-securing assembly 200 securely retaining the rear-view camera 300 within the camera chamber 204, according to an embodiment of the present disclosure. As shown, the tab 228 of the securing latch 220 is securely retained within the slot 230 of the securing bracket 202. The beam 224 of the securing latch 220 may include angled surfaces 221 and 223 that are configured to conform to the outer contours of the rear-view camera 300. However, the securing latch 220 may be various shapes, sizes, contours, and the like, depending on the size, shape, and contours of a particular rear-view camera that is to be secured within the camera chamber 204.

Figure 13:
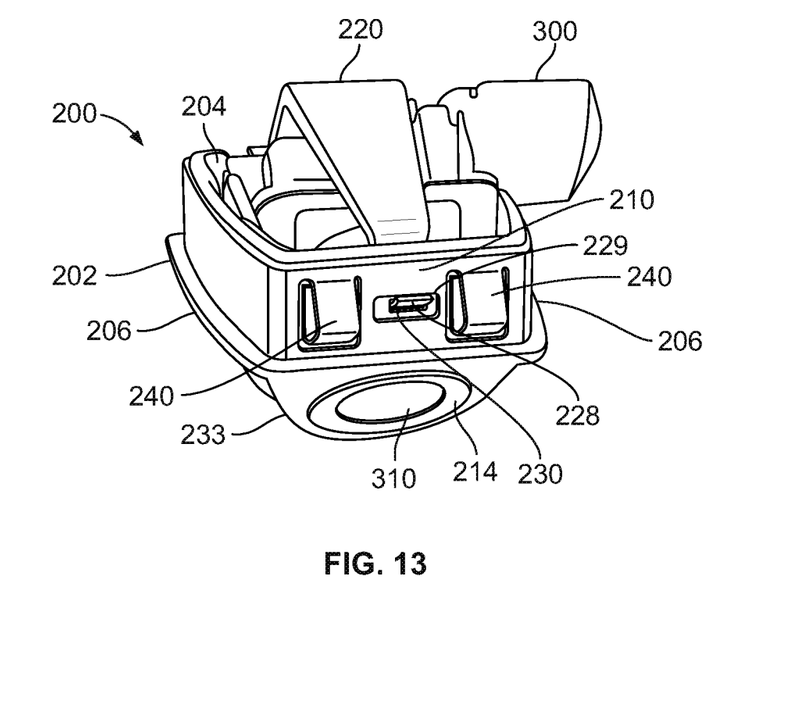
FIG. 13 illustrates an isometric front view of a vehicle camera-securing assembly securely retaining a rear-view camera within a camera chamber, according to an embodiment of the present disclosure.

FIG. 13 illustrates an isometric front view of the vehicle camera-securing assembly 200 securely retaining the rear-view camera 300 within the camera chamber 204, according to an embodiment of the present disclosure. The tab 228 may include a resilient lip 229 that securely latches onto an edge of the lower wall 210 that defines the slot 230.

As noted, the securing bracket 202 may include an angled bottom wall 233 that connects to the lower wall 210 and the lateral walls 206. The angled bottom wall 233 may include the lens channel 214 through which the lens 310 of the rear-view camera 300 passes.

Figure 14:
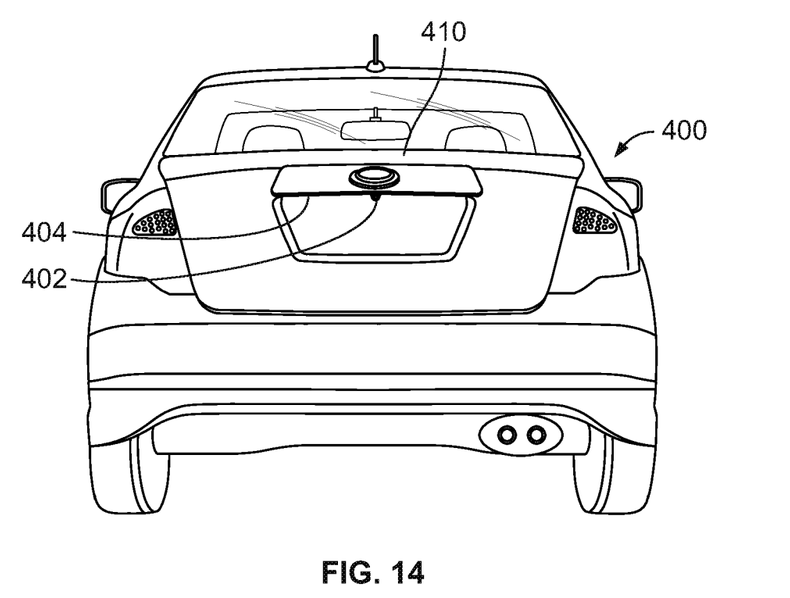
FIG. 14 illustrates a rear view of a vehicle having a rear-view camera, according to an embodiment of the present disclosure.
Figure 15:
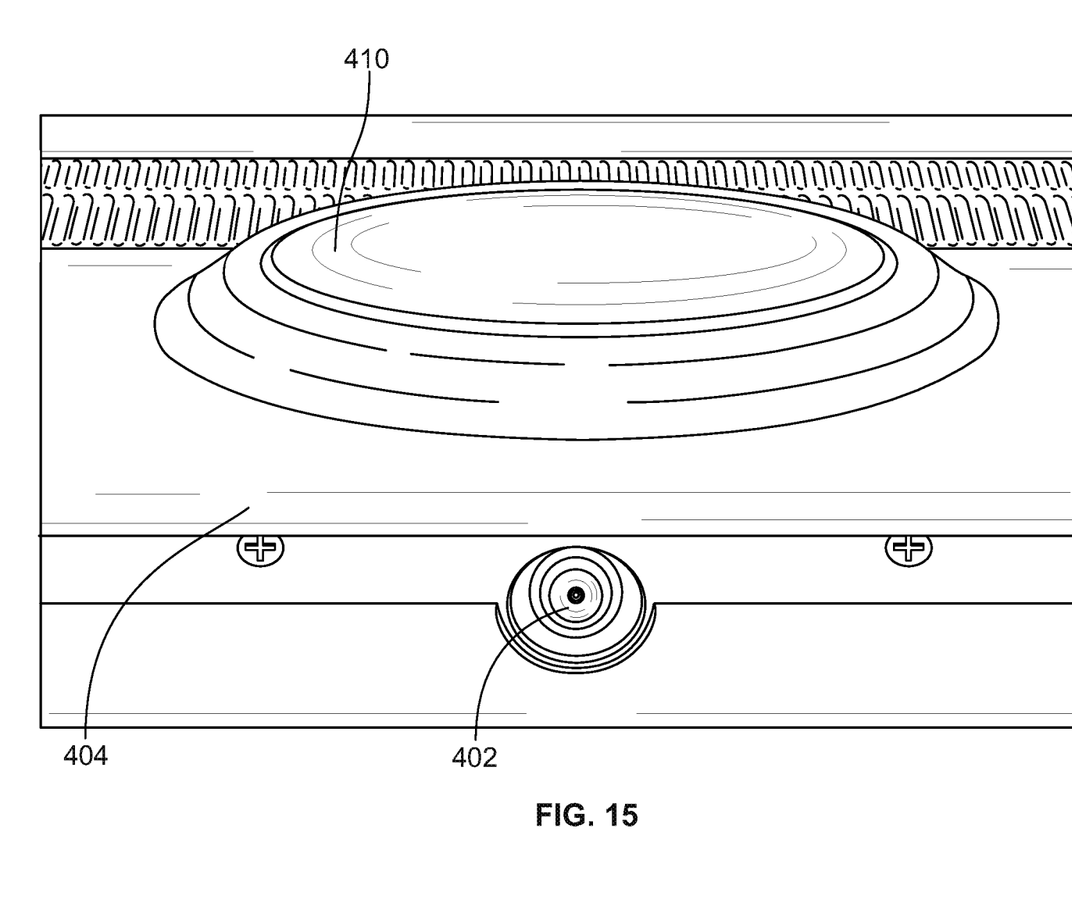
FIG. 15 illustrates a camera lens underneath a light bar of a vehicle, according to an embodiment of the present disclosure.

FIG. 14 illustrates a rear view of a vehicle 400 having a lens 402 of a rear-view camera, according to an embodiment of the present disclosure. FIG. 15 illustrates a lens 402 underneath a light bar 404 of the vehicle 400, according to an embodiment of the present disclosure. Referring to FIGS. 14 and 15, instead of being positioned through a portion of an emblem plate 410, the lens 402 of the rear-view camera may extend into or through a portion of the vehicle 400 at or below the light bar 404. The rear-view camera may be secured to the vehicle 400 through any of the vehicle camera-securing assemblies described above.

Referring to FIGS. 1-14, embodiments of the present disclosure provide a vehicle camera-securing assembly that may be secured to or otherwise proximate various portions of a rear of a vehicle. The vehicle camera-securing assembly may be positioned within an emblem plate, underneath a light bar, on or within a panel or applique located at the rear of a vehicle, or the like.

Embodiments of the present disclosure provide a vehicle camera-securing assembly that is easy to install; reduces, eliminates, or otherwise minimizes camera movement; and ensures proper camera location. Embodiments of the present disclosure provide a vehicle camera-securing assembly that may be used to securely retain a vehicle camera, and position a lens of the camera at any location on or within the vehicle. For example, embodiments of the present disclosure may be used to secure a camera within a cabin of a vehicle, such as a police cruiser, in order to monitor and record movements of a person within a back seat section of the police cruiser.

Embodiments of the present disclosure provide a vehicle camera-securing assembly that may be used to secure a rear-view camera to an emblem plate (or to any other portion) of a vehicle with less components, as compared to known assemblies. Therefore, the process of assembling and securing the camera to the vehicle is much simpler, quicker, and efficient. Instead of using four, five, or six separate components to secure the camera to the emblem plate (such as used by known assemblies), embodiments of the present disclosure utilize a single securing bracket, thereby making the manufacturing and assembly process more efficient. The vehicle camera-securing assembly is devoid of separate and distinct fasteners, such as screws, bolts and the like. The camera is secured to the vehicle camera-securing assembly without the use of separate and distinct fasteners, such as screws or bolts.

The process of securing the rear-view camera to the emblem plate may include snapping the camera into the securing bracket to form the vehicle camera-securing assembly, and then snapping the camera-securing assembly into the emblem plate. Alternatively, the process of securing the rear-view camera may include positioning the rear-view camera within a camera chamber, and securely latching the rear-view camera therein, by way of a pivoting securing latch, for example.

Embodiments of the present disclosure provide a vehicle camera-securing assembly having a simpler and more efficient design. Embodiments also provide an assembly that is lighter and smaller than known assemblies.

Embodiments of the present disclosure provide a video monitoring system that includes a camera secured to a portion of a vehicle through a vehicle-camera securing assembly, as discussed above.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A vehicle camera-securing assembly configured to secure a camera to a portion of a vehicle, the vehicle camera-securing assembly comprising:
a securing bracket including a base and a plurality of walls including front and rear walls integrally connected to lateral walls at right angles upstanding from the base defining a camera chamber configured to receive the camera; and a plurality of planar support ledges extending perpendicular to the plurality of walls at the base
at least one camera-securing member configured to securely retain the camera within the camera chamber, wherein the at least one camera-securing member comprises a plurality of retaining clips inwardly extending into the camera chamber inwardly away from an interior surface of opposing walls of the plurality of walls towards a center of the camera chamber.

2. The vehicle camera-securing assembly of claim 1, wherein the one or more retaining clips comprises first and second opposed retaining clips extending from first and second walls of the one or more of the plurality of walls.

3. The vehicle camera-securing assembly of claim 1, wherein the one or more retaining clips comprises a resilient beam integrally connected to a detent.

4. The vehicle camera-securing assembly of claim 1, wherein the securing bracket further comprises a lens channel configured to receive a lens of the camera.

5. The vehicle camera-securing assembly of claim 4, wherein the securing bracket further comprises said support ledges surrounding at least a portion of the lens channel, wherein the support ledges are configured to abut against at least a portion of the camera.

6. The vehicle camera-securing assembly of claim 1, wherein the securing bracket further comprises at least one support brace ramp extending from at least one of the plurality of walls, wherein the at least one support brace ramp is configured to support the securing bracket within the portion of the vehicle.

7. The vehicle camera-securing assembly of claim 1, wherein the securing bracket further comprises one or more ledges outwardly extending from one or more of the plurality of walls, wherein the one or more ledges are configured to be securely engaged by one or more reciprocal features of at least a portion of the vehicle.

8. The vehicle camera-securing assembly of claim 1, wherein the at least one camera-securing member comprises a securing latch configured to pivot over the camera chamber.

9. The vehicle camera-securing assembly of claim 8, wherein the securing latch comprises a beam integrally connected to one of the plurality of walls through a hinge, and wherein the beam comprises one of a distal tab or slot.

10. The vehicle camera-securing assembly of claim 1, wherein the securing bracket and the at least one camera-securing member are devoid of separate and distinct fasteners.

11. The vehicle camera-securing assembly of claim 1, wherein the portion of the vehicle is one of an emblem plate, applique, or underneath a light bar.

12. A video monitoring system configured to be secured to a portion of a vehicle, the video monitoring system comprising:
a vehicle camera-securing assembly comprising:
a securing bracket including a base and a plurality of walls including front and rear walls integrally connected to lateral walls at right angles upstanding from the base defining a camera chamber; and a plurality of planar support ledges extending perpendicular to the plurality of walls at the base
at least one camera-securing member, wherein the at least one camera-securing member comprises a plurality of retaining clips inwardly extending into the camera chamber inwardly away from an interior surface of opposing walls of the plurality of walls towards a center of the camera chamber; and
a camera positioned within the camera chamber, wherein the camera is securely retained within the camera chamber by the at least one camera-securing member, wherein the plurality of retaining clips securely engage at least a portion of the camera.

13. The video monitoring system of claim 12, wherein the one or more retaining clips comprises first and second opposed retaining clips extending from first and second walls of the one or more of the plurality of walls.

14. The video monitoring system of claim 12, wherein the one or more retaining clips comprises a resilient beam integrally connected to a detent.

15. The video monitoring system of claim 12, wherein the securing bracket further comprises:
a lens channel, and wherein the camera comprises a housing and a lens extending from the housing, wherein the lens is positioned within the lens channel; and said
support ledges surrounding at least a portion of the lens channel, wherein the support ledges abut against at least a portion of the housing.

16. The video monitoring system of claim 12, wherein the securing bracket further comprises at least one support brace ramp extending from at least one of the plurality of walls, wherein the at least one support brace ramp is configured to support the securing bracket within the portion of the vehicle.

17. The video monitoring system of claim 12, wherein the securing bracket further comprises one or more ledges outwardly extending from one or more of the plurality of walls, wherein the one or more ledges are configured to be securely engaged by one or more reciprocal features of at least a portion of the vehicle.

18. The video monitoring system of claim 12, wherein the at least one camera-securing member comprises a securing latch configured to pivot over the camera chamber, wherein the securing latch comprises a beam integrally connected to one of the plurality of walls through a hinge, and wherein the beam comprises one of a distal tab or slot.

* * * * *